(12) United States Patent
Yamaki et al.

(10) Patent No.: US 8,436,501 B2
(45) Date of Patent: May 7, 2013

(54) ROTOR, MANUFACTURING METHOD THEREOF AND ELECTRIC GEAR MOTOR HAVING THE ROTOR

(75) Inventors: Takao Yamaki, Toyohashi (JP); Seiichi Murakami, Hamamatsu (JP); Masumi Tsuchida, Toyokawa (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 231 days.

(21) Appl. No.: 13/079,975

(22) Filed: Apr. 5, 2011

(65) Prior Publication Data

US 2011/0285229 A1 Nov. 24, 2011

(30) Foreign Application Priority Data

May 21, 2010 (JP) ................................. 2010-117516

(51) Int. Cl.
*H02K 7/06* (2006.01)
(52) U.S. Cl.
USPC .............................................. 310/83; 310/90
(58) Field of Classification Search .................... 310/83, 310/90, 79 D, 98, 99; 29/596, 598
See application file for complete search history.

(56) References Cited

U.S. PATENT DOCUMENTS

| | | | | |
|---|---|---|---|---|
| 4,227,104 A * | 10/1980 | Hamman | ..................... | 310/75 R |
| 4,399,380 A * | 8/1983 | Hirano | ............................. | 310/62 |
| 5,777,411 A * | 7/1998 | Nakajima et al. | ................ | 310/83 |
| 6,276,838 B1 | 8/2001 | Lauk et al. | | |
| 7,898,142 B2 * | 3/2011 | Uchimura et al. | ............. | 310/249 |
| 2006/0273672 A1 * | 12/2006 | Inoue et al. | ...................... | 310/83 |
| 2007/0205680 A1 * | 9/2007 | Miyoshi et al. | ................. | 310/90 |
| 2009/0001829 A1 * | 1/2009 | Uchimura et al. | ............... | 310/83 |
| 2010/0224019 A1 * | 9/2010 | Huck et al. | ....................... | 74/425 |
| 2011/0221291 A1 * | 9/2011 | Mili et al. | ........................ | 310/77 |

FOREIGN PATENT DOCUMENTS

| | | |
|---|---|---|
| DE | 3411693 A1 | 11/1984 |
| JP | U-06-9359 | 2/1994 |
| JP | Y-06-9563 | 3/1994 |
| JP | U-06-70461 | 9/1994 |
| JP | A-2009-195027 | 8/2009 |
| JP | A-2009-207297 | 9/2009 |

\* cited by examiner

*Primary Examiner* — Thanh Lam
(74) *Attorney, Agent, or Firm* — Posz Law Group, PLC (57) ABSTRACT

A bearing is positioned relative to a rotatable shaft by inserting the bearing over the rotatable shaft until the bearing contacts a flange of the rotatable shaft, which is cold-forged on the rotatable shaft. The bearing is fixed to the rotatable shaft such that a swaged portion is formed in an outer peripheral portion of the rotatable shaft on an opposite axial side of the bearing, which is axially opposite from the flange, by swaging a corresponding part of the outer peripheral portion of the rotatable shaft such that the corresponding part of the outer peripheral portion of the rotatable shaft is radially outwardly bulged to form the swaged portion, and the swaged portion is axially pressed against the bearing to axially securely clamp the bearing between the swaged portion and the flange.

12 Claims, 4 Drawing Sheets

ROTOR, MANUFACTURING METHOD THEREOF AND ELECTRIC GEAR MOTOR HAVING THE ROTOR

CROSS REFERENCE TO RELATED APPLICATION

This application is based on and incorporates herein by reference Japanese Patent Application No. 2010-117516 filed on May 21, 2010.

BACKGROUND OF THE INVENTION

1. Field of the Invention:

The present invention relates to a rotor, a manufacturing method thereof and an electric gear motor having the rotor.

2. Description of Related Art

A previously known rotatable worm shaft, which forms a rotatable shaft of an electric gear motor, is provided with a bearing, such as a ball bearing, that is fixed to the worm shaft at a location between a worm portion of the worm shaft, which is formed at a distal end side and has a worm, and a base end side portion of the worm shaft, at which a rotor core is fixed.

For instance, in a case of the motor recited in Japanese Unexamined Patent Publication No. 2009-195027A, at the time of fixing the ball bearing to the rotatable shaft, an annular stop ring, which is configured into a C-shape, is installed into an annular groove of the shaft. Then, the ball bearing is received over the shaft. Thereafter, a cylindrical fixing member is received over the rotatable shaft from the opposite axial side of the ball bearing, which is opposite from the stop ring, so that the ball bearing is clamped between the stop ring and the cylindrical fixing member and is thereby axially securely positioned.

In another case of the motor recited in Japanese Unexamined Patent Publication No. 2009-207297A, a first stop ring, which is configured into a C-shape, is installed into a first annular groove of the shaft. Thereafter, the ball bearing is received over the shaft. Then, a second stop ring, which is configured into a C-shape, is installed into a second annular groove of the shaft, which is provided on an opposite axial side of the ball bearing that is opposite from the first annular groove. Furthermore, another annular processing groove is formed in the shaft on an axial side of the second annular groove, which is opposite from the first annular groove, so that a radial projection is bulged, i.e., is produced between the second annular groove and the processing groove. Then, this bulged radial projection and the second stop ring are axially pressed against the ball bearing, so that the ball bearing is axially securely positioned relative to the shaft. Furthermore, in Japanese Unexamined Patent Publication No. 2009-207297A, instead of forming the processing groove, it is also recited to form an annular projection in the shaft at a location, which is on an axial side of the first groove and is adjacent to the first groove. Then, the radial projection and the first stop ring are axially pressed against the ball bearing, so that the ball bearing is axially securely positioned relative to the shaft.

Furthermore, in another case of the motor recited in Japanese Unexamined Utility Model Publication No. H06-9359U, the ball bearing, which is received over the shaft, is axially clamped between a stop ring, which is configured into a C-shape and is installed into an annular groove of the shaft, and a housing of the motor. In this way, the ball bearing is securely positioned relative to the rotatable shaft.

Furthermore, in another case recited in Japanese Unexamined Utility Model Publication No. H06-70461U or Japanese Examined Utility Model Publication No. H06-9563Y, an annular projection is bulged, i.e., is produced in the outer peripheral surface of the shaft by pressing the outer peripheral surface of the shaft, and the ball bearing, which is received over the shaft, is clamped between the bulged annular projection and the housing of the motor. In this way, the ball bearing is securely positioned relative to the rotatable shaft.

However, in the case of fixing the ball bearing to the shaft in the manner recited in Japanese Unexamined Patent Publication No. 2009-195027A, Japanese Unexamined Patent Publication No. 2009-207297A or Japanese Unexamined Utility Model Publication No. H06-9359U, the groove forming process for forming the groove on the shaft should be performed, and the separate component(s), such as the stop ring or fixing member, should be installed to the shaft. Therefore, the processing costs, the component costs and the assembling costs are disadvantageously increased.

Furthermore, when the rotatable shaft, which has the annular projection, is formed like in the case of Japanese Unexamined Patent Publication No. 2009-207297A, a shaft preform having an outer diameter, which is equal to the outer diameter of the annular projection, may be processed through a cutting process to form such a shaft. In such a case, the shaft preform, which has the large diameter, i.e., the shaft preform, which is relatively expensive in terms of its material costs due to the increased amount of the material, is used to form the shaft. A majority of the shaft preform is cut to form the annular projection in the shaft, so that the large amount of waste material is generated. Therefore, the material costs and the processing costs become expensive, and the amount of waste material becomes large.

Furthermore, when the ball bearing is fixed to the shaft in the manner discussed in Japanese Unexamined Utility Model Publication No. H06-70461U or Japanese Examined Utility Model Publication No. H06-9563Y, the ball bearing cannot be held in place relative to the shaft until the rotor is assembled to the housing. Therefore, the ball bearing may possibly be detached from the shaft in the middle of the assembling. In order to alleviate the above disadvantages, it is conceivable to form the annular projection (swaged projection) in the outer peripheral surface of the shaft at two opposed axial sides, respectively, of the ball bearing. In such a case, the ball bearing is inserted over the shaft until it contacts the first one of the annular projections (swaged projections). Thereafter, the second one of the annular projections is formed in the outer peripheral surface of the shaft on the opposite axial side of the ball bearing, which is opposite from the first one of the annular projections. However, at the time of forming the second one of the annular projections, an axial force is applied to the ball bearing, so that the first one of the annular projections may be deformed to cause an axial positional deviation of the ball bearing. Therefore, it is difficult to accurately position the ball bearing relative to the shaft. Furthermore, the ball bearing is inserted over the shaft between the formation of the first one of the annular projections and the second one of the annular projections. Therefore, the time required to fix the ball bearing is disadvantageously lengthened.

SUMMARY OF THE INVENTION

The present invention addresses at least one of the above disadvantages. According to the present invention, there is provided a manufacturing method of a rotor for an electric gear motor, wherein the rotor includes a rotatable shaft and a bearing, and the bearing is fixed to the rotatable shaft at an axial location between a worm portion, in which a worm is formed, and a core fixation portion, which is adapted to securely hold a rotor core of the rotor therearound. According to the manufacturing method, a shaft preform, which is made of metal and has a generally constant outer diameter along a generally entire length of the shaft preform, is shaped by cold forging to form the rotatable shaft, so that a small diameter portion, which has an outer diameter smaller than an outer diameter of the core fixation portion, is cold-forged on the shaft preform, and a flange, which is configured into an annular form and has an outer diameter larger than the outer diameter of the core fixation portion, is cold-forged on the shaft preform at the axial location between the small diameter portion and the core fixation portion. The worm is formed in the small diameter portion to produce the worm portion having the worm by thread rolling after the shaping of the shaft preform. The bearing is positioned relative to the rotatable shaft by inserting the bearing over the rotatable shaft until the bearing contacts the flange after the forming of the worm. The bearing is fixed to the rotatable shaft after the positioning of the bearing such that a swaged portion is formed in an outer peripheral portion of the rotatable shaft on an opposite axial side of the bearing, which is axially opposite from the flange, by swaging a corresponding part of the outer peripheral portion of the rotatable shaft such that the corresponding part of the outer peripheral portion of the rotatable shaft is radially outwardly bulged to form the swaged portion, and the swaged portion is axially pressed against the bearing to axially securely clamp the bearing between the swaged portion and the flange.

According to the present invention, there is also provided a rotor for an electric gear motor, including a rotatable shaft and a bearing. The rotatable shaft is made of metal and includes a worm portion, in which a worm is formed, and a core fixation portion, which securely holds a rotor core therearound. The bearing is fixed to the rotatable shaft at an axial location between the worm portion and the core fixation portion. The rotatable shaft further includes a flange and a swaged portion. The flange is cold-forged on the rotatable shaft and is configured into an annular form. An outer diameter of the flange is larger than an outer diameter of the core fixation portion. The swaged portion is swaged on the rotatable shaft on an opposite axial side of the bearing that is axially opposite from the flange. The swaged portion is pressed against the bearing to axially securely clamp the bearing between the flange and the swaged portion According to the present invention, there is also provided an electric gear motor, which includes the above-discussed rotor, a yoke housing, a yoke-side bearing and a gear housing. The yoke housing receives the rotor in an inside of the yoke housing and has at least one permanent magnet fixed in the inside of the yoke housing to radially oppose the rotor core. The yoke-side bearing is held in the inside of the yoke housing and rotatably supports a base end part of the rotatable shaft. The gear housing is connected to the yoke housing and holds the bearing of the rotor in an inside of the gear housing, wherein the gear housing rotatably receives the worm and a worm wheel which are meshed with each other, in the inside of the gear housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
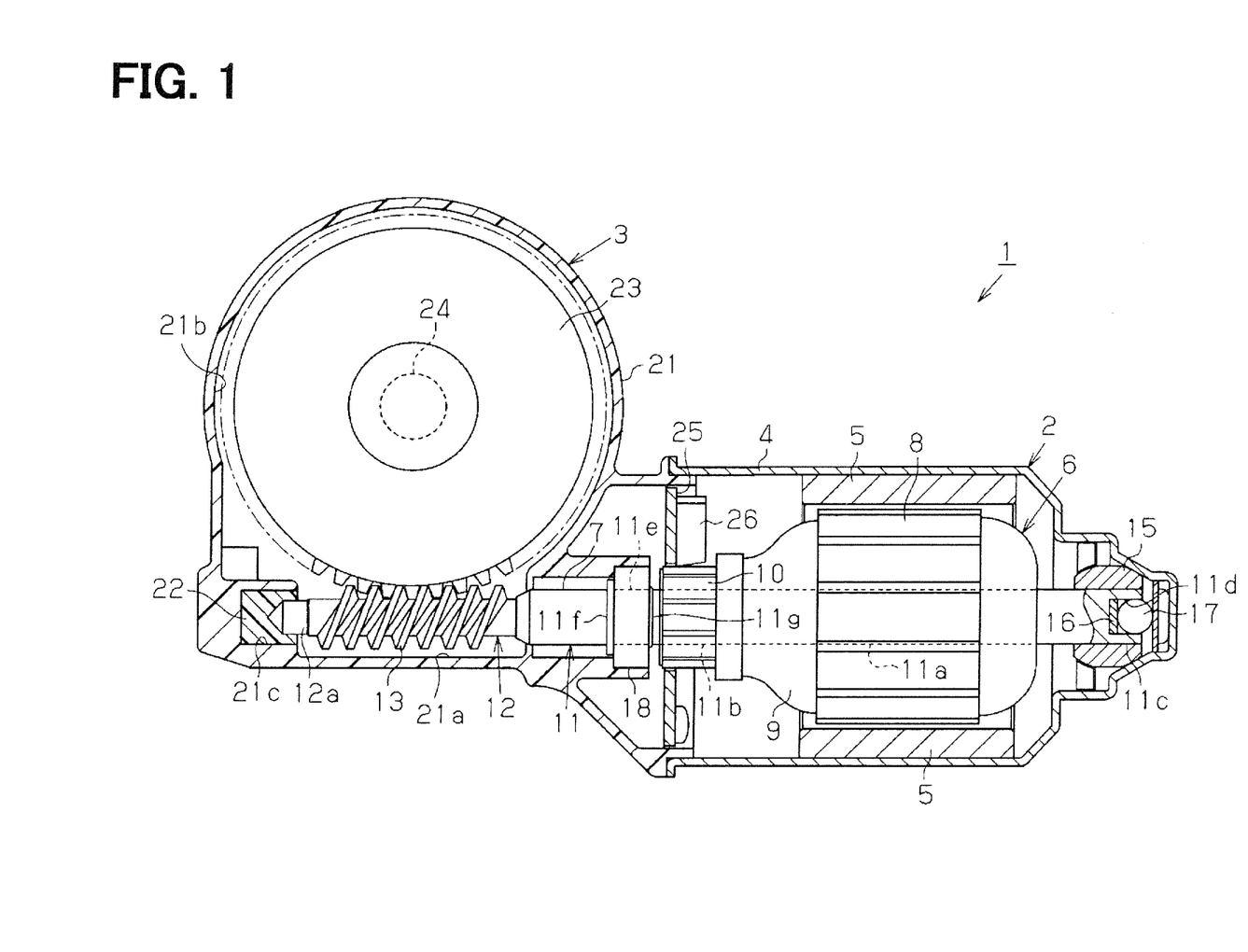
FIG. 1 is a longitudinal cross-sectional view of an electric gear motor according to an embodiment of the present invention.

FIG. 1 is a cross-sectional view of an electric motor 1 according to an embodiment of the present invention. The motor 1 of the present embodiment is an electric gear motor (also referred to as an electric speed reducing gear motor) that is used as a drive source of a wiper apparatus of a vehicle (e.g., an automobile). The motor 1 includes a motor unit 2, which generates a rotational force, and a speed reducing unit 3, which reduces a rotational speed of rotation transmitted from the motor unit 2 before outputting the rotation of the reduced speed (rotational drive force) from the speed reducing unit 3.

A plurality of permanent magnets (one or more pairs of diametrically opposed permanent magnets) 5 is fixed to an inner, peripheral surface of a yoke housing 4 of the motor unit 2, which is configured into a cup-shaped body. A rotor 6 is placed radially inward of the magnets 5. The rotor 6 includes a rotatable shaft (also referred to as a rotatable worm shaft) 7, a rotor core 8, windings 9 and a commutator 10. Specifically, the motor unit 2 is constructed as a direct current electric motor having two, four or more poles.

The rotatable shaft 7 includes a shaft main body 11, which is formed as a cylindrical rod. The shaft main body 11 extends from a base end part (a right end part in FIG. 1) of the rotatable shaft 7 to a predetermined distal end side location of the rotatable shaft 7. The rotatable shaft 7 further includes a worm portion 12, which is located on a distal end side of the shaft main body 11 and is configured into a cylindrical body having an outer diameter (the outer diameter being measured at a smooth cylindrical part of the worm portion 12 where a worm 13 is not formed) that is smaller than that of the shaft main body 11. The worm 13, which is configured into a spiral tooth, is formed in the worm portion 12. In this instance, an addendum circle of the worm 13 is larger than the outer diameter of the shaft main body 11 and the outer diameter of the rest (the smooth cylindrical part) of the worm portion 12 where the worm 13 is not formed. Alternatively, the addendum circle of the worm 13 may be slightly smaller than the outer diameter of the shaft main body 11, if desired.

The shaft main body 11 has a generally constant outer diameter along a generally entire length of the shaft main body 11 except a distal end part (the left end part in FIG. 1) of the shaft main body 11, which is tapered. A core fixation portion 11a, to which the rotor core 8 is fixed, is formed in an axial center part of the shaft main body 11 Furthermore, a commutator fixation portion 11b, to which the commutator 10 is fixed, is formed on the distal end side of the core fixation portion 11a The windings 9 are wound around the rotor core 8, which is fixed to the core fixation portion 11a and has an outer surface coated with a dielectric coating. Furthermore, the windings 9 are connected to the commutator 10, which is configured into a cylindrical body and is fixed to the commutator fixation portion 11b.

A first support portion 11c is formed in the base end part of the shaft main body The first support portion 11c is radially supported by a yoke-side bearing 15 (plain bearing in this instance), which is fixed to a bottom center part of the yoke housing 4. A receiving recess 11d is axially recessed in a base end surface of the first support portion 11c, i.e., a base end surface of the shaft main body 11 at a shaft forging step discussed below. A steel plate 16 and a steel ball 17, which receive a thrust load of the rotatable shaft 7, are received in the receiving recess 11d.

Figure 2:
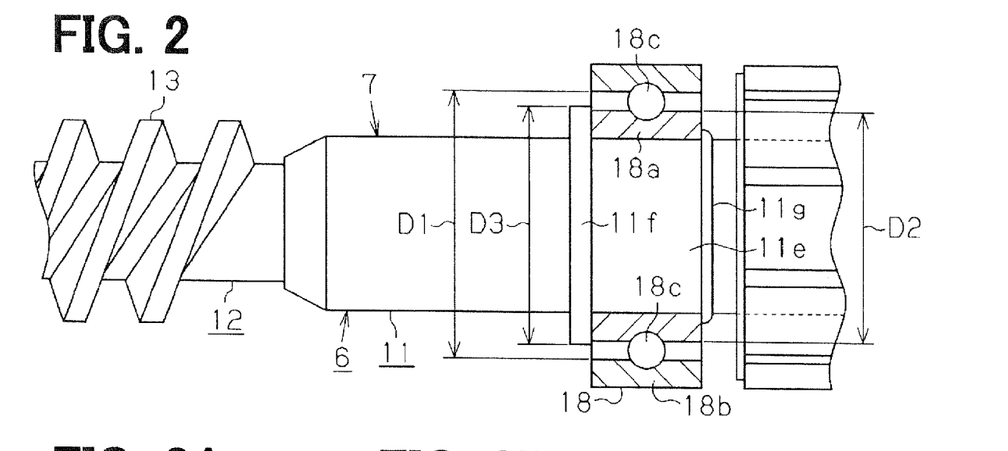
FIG. 2 is a partial enlarged view of a rotor of the electric motor shown in FIG. 1.

Furthermore, a second support portion 11e is formed in the shaft main body 11 at a location between the core fixation portion 11a and the worm portion 12 in the rotatable shaft 7. A ball bearing (serving as a rolling-element bearing) 18 is fixed to the second support portion 11e. As shown in FIG. 2, the ball bearing 18 includes an inner race 18a, an outer race 18b and a plurality of balls (rolling elements) 18c. The inner race 18a is configured into an annular body (ring body). The outer race 18b is configured into an annular body (ring body) and is placed radially outward of the inner race 18a The balls 18c are interposed between the inner race 18a and the outer race 18b in a rotatable manner. An inner diameter of the inner race 18a is generally the same as an outer diameter of the shaft main body 11 and is fixed to an outer peripheral surface of the second support portion 11e to rotate integrally with the rotatable shaft 7.

Furthermore, an inner diameter D1 of the outer race 18b is larger than an outer diameter D2 of the inner race 18a, and the outer race 18b is supported by a gear housing 21 of the speed reducing unit 3, as shown in FIG. 1. An axial width of, the inner race 18a is generally the same as an axial width of the outer race 18b, and the inner race 18a and the outer race 18b are coaxial with the rotatable shaft 7. The balls 18c, which are rotatably interposed between the inner race 18a and the outer race 18b, are generally identical to each other and are configured as spherical balls.

A flange 11f is formed in the shaft main body 11 at a location, which is on a worm portion 12 side of the ball bearing 18 (i.e., a side opposite from the core fixation portion 11a). The flange 11f has an outer diameter D3 that is larger than an outer diameter of the core fixation portion 11a and is larger than an outer diameter D4 of a shaft preform 30 (see FIG. 3A), which is a material to be processed into the rotatable shaft 7. The flange 11f is formed through the cold forging process by plastically deforming the shaft preform 30. The flange 11f is configured into an annular form (ring form). That is, the flange 11f radially outwardly projects from the shaft main body 11 and continuously extends all around the shaft main body 11 in the circumferential direction of the shaft main body 11. The outer diameter D3 of the flange 11f is larger than the outer diameter D2 of the inner race 18a and is smaller than the inner diameter D1 of the outer race 18b The ball bearing 18 contacts an end surface of the flange 11f, which is axially opposite from the worm portion 12. The inner race 18a axially contacts the flange 11f. In contrast, the outer race 18b does not contact the flange 11f since the outer race 18b is located radially outward of an outer peripheral surface (outer peripheral edge) of the flange 11f.

A swaged portion 11g is integrally formed in the shaft main body 11 at a location, which is on an opposite axial side of the ball bearing 18 that is opposite from the flange 11f. That is, the swaged portion 11g is located on the axial side of the ball bearing 18 where the core fixation portion 11a is located The swaged portion 11g is formed by swaging a corresponding part of the shaft main body 11, which is axially adjacent to the ball bearing 18 on the opposite axial side of the ball bearing 18 that is opposite from the flange 11f. The swaged portion 11g slightly radially outwardly bulges, i.e., projects from the outer peripheral surface of the shaft main body 11. Furthermore, the swaged portion 11g is configured into an annular form (ring form) and thereby extends all around the shaft main body 11 in the circumferential direction. The ball bearing 18, more specifically, the inner race 18a of the ball bearing 18 is axially clamped between the swaged portion 11g and the flange 11f. Thereby, the ball bearing 18 is fixed to the rotatable shaft 7 in the state where the ball bearing 18 is axially positioned relative to the rotatable shaft 7 by the swaged portion 11g and the flange 11f. The flange 11f, which is formed by plastically deforming the shaft preform 30 through the cold forging process, radially outwardly projects further away from the swaged portion 11g. An axial thickness of the flange 11f, which is measured in the axial direction of the rotatable shaft 7, is larger than that of an outer peripheral part of the swaged portion 11g, which radially outwardly projects and contacts the ball bearing 18 (more specifically, the inner race 18a). In other words, the flange 11f is configured to have the sufficient axial wall thickness, which provides the sufficient strength to the flange 11f to withstand the axial load applied from the swaged portion 11g through the ball bearing 18 at the time of swaging the swaged portion 11g, so that the flange 11f is not substantially deformed by the applied axial load, and thereby the ball bearing 18 can be advantageously held in place.

As shown in FIG. 1, a third support portion 12a, which has an outer diameter smaller than a base end part of the worm portion 12, is formed in a distal end part of the worm portion 12. A distal end part of the third support portion 12a is configured into a conical form that has an outer diameter, which decreases toward the distal end thereof.

The rotor 6 of the above-discussed construction is received in the inside of the yoke housing 4 such that the first support portion 11 c of the rotatable shaft 7 is inserted into the yoke-side bearing 15 held at the bottom part of the yoke housing 4, and the steel ball 17, which is received in the receiving recess 11d, contacts the bottom part of the yoke housing 4. The rotor core 8 is radially opposed to the magnets 5 in the inside of the yoke housing 4. The yoke housing 4 (i.e., the motor unit 2), into which the rotor 6 is received, is connected to the gear housing 21 of the speed reducing unit 3.

The gear housing 21 of the speed reducing unit 3 includes a shaft receiving portion 21a and a wheel receiving portion 21b The shaft receiving portion 21a receives the distal end part of the rotatable shaft 7, which projects from the motor unit 2. The wheel receiving portion 21b is connected to the shaft receiving portion 21a The outer race 18b of the ball bearing 18 is received and is supported at a cylindrical part of the shaft receiving portion 21a, which is located at a base end side (motor unit 2 side) in the shaft receiving portion 21a. The outer race 18b is securely received in the cylindrical part of the shaft receiving portion 21a, which is located at the base end side, without having a backlash in the radial direction. Here, it should be noted that the gear housing 21 does not have a structure, which limits axial removal of the outer race 18b.

A bearing receiving recess 21c is formed in a distal end part of the shaft receiving portion 21a, which receives the third support portion 12a. A worm-side bearing 22, which is made of a resin material, is provided in the bearing receiving recess 21c to rotatably support the third support portion 12a. The rotatable shaft 7 is rotatably supported by the worm-side bearing 22, the yoke-side bearing 15, which is provided at the bottom center part of the yoke housing 4, and the ball bearing 18. The thrust force of the rotatable shaft 7 is not substantially received by the ball bearing 18 but is substantially received by the steel plate 16, the steel ball 17 and the worm-side bearing 22.

A worm wheel 23, which is configured into a circular disk form and is meshed with the worm 13 of the worm portion 12, is rotatably received in the wheel receiving portion 21b. A cylindrical output shaft 24 is provided at a rotational axis (rotational center) of the worn wheel 23 such that the output shaft 24 is rotated integrally with the worm wheel 23 upon rotation of the worm wheel 23.

A brush device 25 is fixed to a portion of the gear housing 21, which is opposed to the motor unit 2. The brush device 25 holds a plurality of power supply brushes 26 (only one of the brushes 26 being shown in FIG. 1), which slidably contact the commutator 10. The brush device 25 receives an electric power from an external power source through a power supply line and supplies the received electric power to the windings 9 through the power supply brushes 26 and the commutator 10. When the rotor 6 is rotated to rotate the rotatable shaft 7, the rotational speed of the rotation transmitted from the rotatable shaft 7 is reduced by the worm 13 and the worm wheel 23, and the rotation at the reduced rotational speed is then outputted from the output shaft 24. Therefore, the wiper apparatus is driven in response to the rotation of the output shaft 24.

Next, a bearing fixation method of fixing the ball bearing 18 to the rotatable shaft (rotatable worm shaft) 7 having the worm 13 will be described together with a manufacturing method of the rotatable shaft 7 and a manufacturing method of the rotor 6.

Figures 3A, 3B:
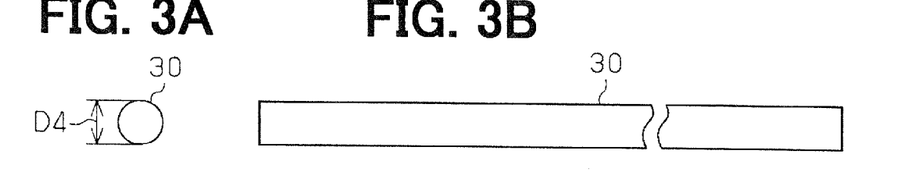
FIG. 3A is an end view of a shaft preform according to the embodiment.
FIG. 3B is a front view of the shaft preform of FIG. 3A.

The rotatable shaft 7 is formed by processing, i.e., shaping the shaft preform 30, which is configured into the cylindrical rod shown in FIGS. 3A and 3B The shaft preform 30 has the, generally constant outer diameter D4, which is generally constant from one axial end to the other axial end of the shaft preform 30, i.e., is generally constant along the generally entire length of the shaft preform 30. Furthermore, the shaft preform 30 is made of a metal material (e.g., carbon steel), which is plastically deformable. First of all, the shaft forging step is performed to form a small diameter portion 30a, which later becomes the worm portion 12 including the third support portion 12a, at the distal end part of the shaft preform 30. In the shaft forging step, the small diameter portion 30a is formed at the distal end part of the shaft preform 30 with a forging die arrangement 31 shown in FIGS. 4A and 4B. The small diameter portion 30a has the outer diameter, which is smaller than the outer diameter of its adjacent part of the shaft preform 30 located on the based end side of the small diameter portion 30a where the core fixation portion 11a is located. In other words, the outer diameter of the small diameter portion 30a is smaller than the outer diameter of the core fixation portion 11a of the rotatable shaft 7. Here, it should be noted that the outer diameter of the small diameter portion 30a is generally the same as the outer diameter of the smooth cylindrical part of the worm portion 12 where the worm 13 is not formed.

The forging die arrangement 31 includes a plurality of divided dies 32-34, which are divided in the axial direction, and a slide die 35. Specifically, the divided dies 32-34 include a first die 32, a second die 33 and a third die 34, which are divided one after another in the axial direction of the shaft preform 30 and are axially displaceable to open the forging die arrangement 31 to allow removable of the forged product from the forging die arrangement 31. In the closed state of the forging die arrangement 31 shown in FIG. 4A, the slide die 35 urges and presses the shaft preform 30 into a forging cavity 31a, which is defined in the first to third dies 32-34 and is configured to correspond with the shape of the rotatable shaft 7. Specifically, the first die 32 includes a worm portion forming surface section 32a of the forging cavity 31 a to form the small diameter portion 30a, which later becomes the worm portion 12 including the third support portion 12a, by forging the distal end part of the shaft preform 30 when the shaft preform 30 is urged against the worm portion forming surface section 32a of the first die 32 by the slide die 35. The worm portion forming surface section 32a serves as a small diameter portion forging section of the forging cavity 31a. The first die 32 further includes a shaft main body support surface section 33b of the forging cavity 31a in a right end part of the first die 32 in FIG. 4A. The second die 33 includes a shaft main body support surface section 33a of the forging cavity 31a, and the third die 34 includes a shaft main body support surface section 34a of the forging cavity 31a. The shaft main body support surface sections 32b, 33a, 34a are cylindrical surface sections having a generally constant inner diameter and cooperate together to support the shaft main body 11 at the time of forming the small diameter portion 30a in the shaft preform 30 with the first die 32. The shaft main body support surface sections 32b, 33a, 34a cooperate together to serve as a shaft main body forging section of the forging cavity 31a.

Figure 4A:
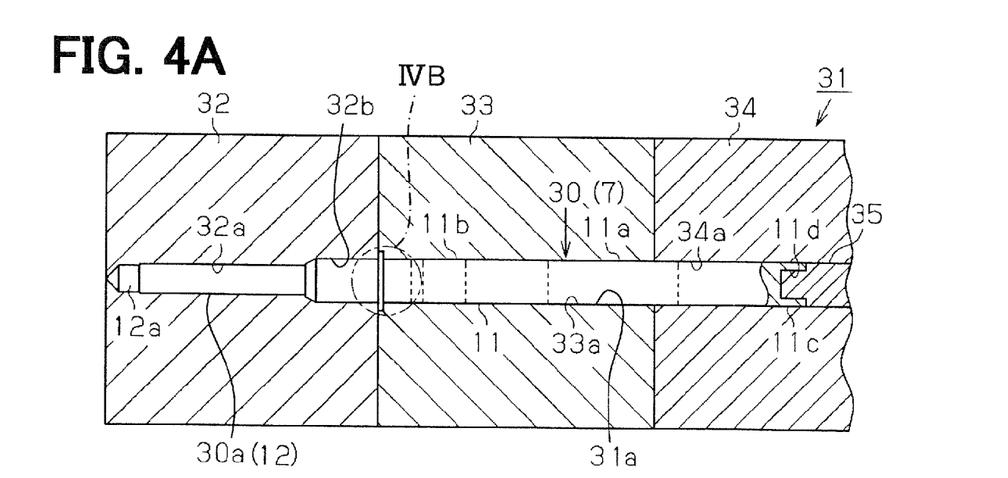
FIG. 4A is a descriptive schematic diagram for describing manufacturing of a shaft of the electric gear motor of the embodiment.
Figure 4B:
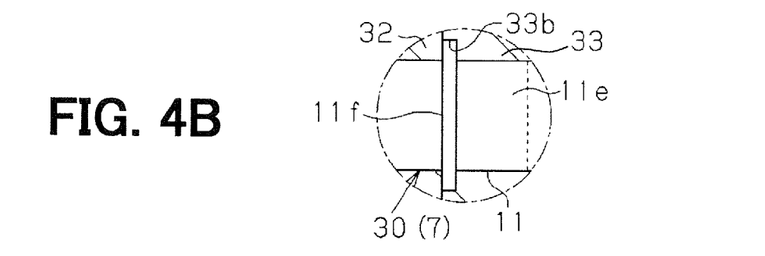
FIG. 4B is a partial enlarged view of an area IVB in FIG. 4A.

Furthermore with reference to FIGS. 4A and 4B, an annular forging recess 33b of the forging cavity 31a is axially recessed from the left end surface of the second die 33 and is radially outwardly recessed in the shaft main body support surface section 33a of the second die 33 to forge the flange 11f on the shaft preform 30. The annular forging recess 33b serves as a flange forging section of the forging cavity 31a. The annular forging recess 33b has a radial depth, which corresponds to the amount of radial projection of the flange 11f from the shaft main body 11. The annular forging recess 33b also has an axial width, which is generally equal to the axial thickness of the flange 11f. As discussed above, the forging die arrangement 31 includes the slide die 35, which has an axial projection to form the receiving recess 11d at the base end surface of the shaft preform 30 by axially urging the shaft preform 30 into the first to third dies 32-34.

At the shaft forging step, the small diameter portion 30a, which later become the worm portion 12 having the worm 13 and has the outer diameter smaller than that of the core fixation portion 11a, is formed at the distal end part of the shaft preform 30 by the cold forging with the forging die arrangement 31. Specifically, the shaft preform 30 is processed with the forging die arrangement 31 through the cold forging process, and thereby the rotatable shaft 7 is formed such that the small diameter portion 30a (the worm portion 12) is produced at the distal end part of the rotatable shaft 7, and the shaft main body 11, which has the outer diameter larger than that of the worm portion 12, is produced on the base end side of the worm portion 12 in the rotatable shaft 7. As is well known in the art, the outer surface of the processed part, which is processed through the cold forging process, is uniform. Therefore, the outer peripheral surface of the worm portion 12, which is formed through the cold forging process, becomes a uniform surface. That is, the worm portion 12, which is formed through the cold forging process, has the improved surface roughness in comparison to the worm portion, which is formed through the cutting process.

At the time of forming the small diameter portion 30*a* (the worm portion 12) through the cold forging process, the flange 11*f* is simultaneously formed at the predetermined location in the distal end part of the shaft main body 11. This predetermined location is a location of the shaft main body 11 between the small diameter portion 30*a* (the worm portion 12) and the core fixation portion 11*a* and is adjacent to the second support portion 11*e*, to which the ball bearing 18 is fixed, on the axial side of the second support portion 11*e* where the small diameter portion 30*a* (the worm portion 12) is located. The flange 11*f* is formed integrally with the rotatable shaft 7 at the time of forming the small diameter portion 30*a* (the worm portion 12) through the cold forging process such that the metal material of the shaft preform 30 is plastically deformed to flow into the annular forging recess 33*b* in the forging die arrangement 31 Furthermore, at the time of forming the small diameter portion 30*a* (the worm portion 12) at the distal end part of the shaft preform 30 with the first to third dies 32-34, the receiving recess 11*d* is simultaneously formed in the base end surface of the shaft preform 30 with the slide die 35 through the cold forging process. At the time of performing the cold forging process, lubricant oil is applied to each corresponding portion of the forging die arrangement 31, which contacts the shaft preform 30 to protect the shaft preform 30. After the completion of the cold forging process, the first die 32 is moved in the axial direction away from the second die 33, and the thus forged shaft 7 is axially removed from the second and third dies 33, 34. At this time, since the annular forging recess 33*b* is axially recessed in the left end surface of the second die 33, the flange 11*f*, which is formed in the annular forging recess 33*b*, can be easily axially removed from the second die 33.

Next, the outer peripheral surface of the shaft main body 11 is ground at a grinding step. At the grinding step, a grindstone (not shown) is placed in sliding contact with the outer peripheral surface of the shaft main body 11, so that the outer peripheral surface of the shaft main body 11 is ground In this way, the surface roughness and the roundness of the outer peripheral surfaces of the first and second support portions 11*c*, 11*e* are improved.

Figure 5:
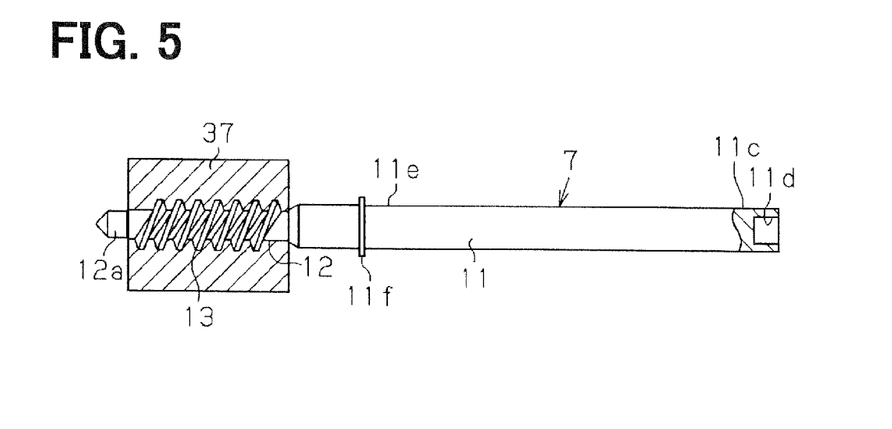
FIG. 5 is a descriptive schematic diagram for describing a worm forming step in the manufacturing of the shaft.

Next, as shown in FIG. 5, a worm forming step is performed to form the worm 13 in the small diameter portion 30*a* (the worm portion 12), which has been processed through the cold forging process at the shaft forging step. At the worm forming step, the small diameter portion 30*a* (the worm portion 12) is held in rolling dies 37, and the rolling dies 37 are rotated or moved to form the worm 13 by thread rolling (a thread rolling process).

Figure 6:
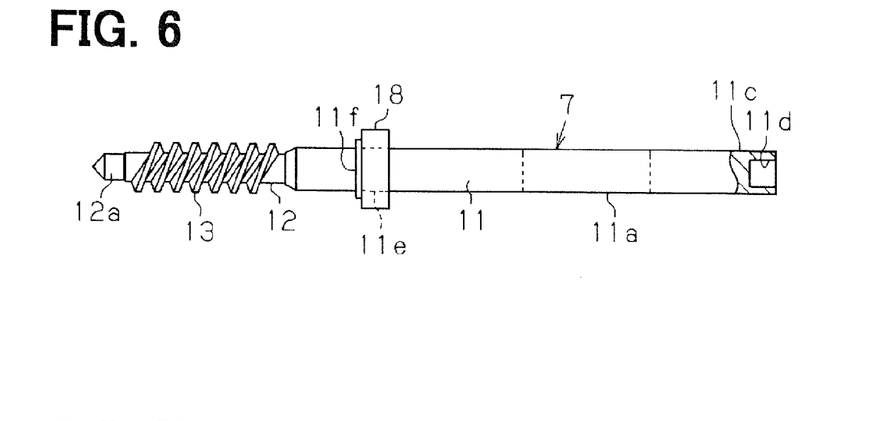
FIG. 6 is a descriptive schematic diagram for describing a part of a bearing fixation method according to the embodiment.

Next, as shown in FIG. 6, the ball bearing 18 is positioned relative to the rotatable shaft 7 at a positioning step. At the positioning step, the ball bearing 18 is inserted over the shaft main body 11 of the rotatable shaft 7 from the axial side, which is opposite from the worm portion 12, i.e., from the base end of the rotatable shaft 7 where the first support portion 11*c* is located. The ball bearing 18 is inserted over the shaft main body 11 toward the distal end side until the ball bearing 18 axially contacts the flange 11*f*. Then, when the ball bearing 18 axially contacts the flange 11*f*, the axial positioning of the ball bearing 18 relative to the rotatable shaft 7 is finished. Specifically, the ball bearing 18 is positioned in the second support portion 11*e* of the rotatable shaft 7.

Figure 7:
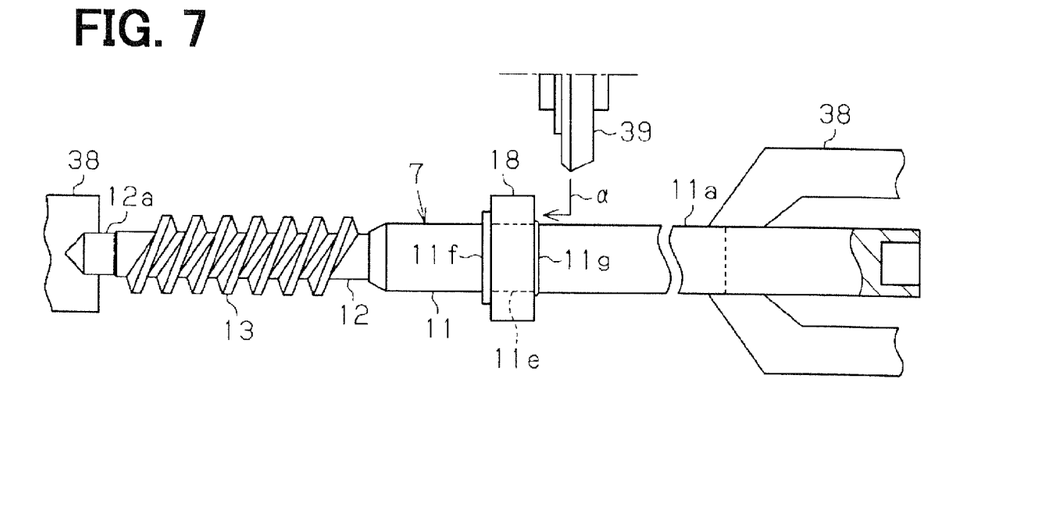
FIG. 7 is a descriptive schematic diagram for describing another part of the bearing fixation method according to the embodiment.

Next, a fixing step is performed to fix the ball bearing 18 in a manner that limits an axial movement of the ball bearing 18 relative to the rotatable shaft 7. At the fixing step, first of all, the shaft main body 11 of the rotatable shaft 7 is securely supported by a work rotating device 38 of a swaging apparatus, as shown in FIG. 7. Then, the work rotating device 38 is driven to rotate the rotatable shaft 7 about the central axis of the rotatable shaft 7. While the rotatable shaft 7 is rotated by the work rotating device 38, a swaging roller (swaging jig) 39 is radially inwardly moved toward of the shaft main body 11 of the rotatable shaft 7. Thus, the swaging roller 39 contacts an adjacent part of the outer peripheral surface of the shaft main body 11, which is adjacent to the ball bearing 18 on the axial side of the ball bearing 18 that is opposite from the flange 11*f*. Then, the swaging roller 39 is further radially inwardly moved toward the rotatable shaft 7 until the swaging roller 39 slightly bites into shaft main body 11, and thereafter the swaging roller 39 is axially moved toward the ball bearing 18, as indicated by an arrow α. In this way, the adjacent part of the shaft main body 11, which is adjacent to the ball bearing 18 on the axial side of the ball bearing 18 that is opposite from the flange 11*f*, is radially outwardly bulged by plastic deformation to form the swaged portion 11*g*. At the same time, the swaged portion 11*g* is axially urged against the ball bearing 18 by the swaging roller 39. Thus, the ball bearing 18, more specifically, the inner race 18*a* is axially clamped between the swaged portion 11*g* and the flange 11*f*, so that the ball bearing 18 is fixed in the manner that limits the axial movement of the ball bearing 18.

The swaged portion 11*g*, which axially urges the ball bearing 18 against the flange 11*f*, is formed by urging the swaging roller 39 against the shaft main body 11 while rotating the rotatable shaft 7. Therefore, the swaged portion 11*g* is formed into an annular form that circumferentially extends all around the shaft main body 11 on the axial side of the ball bearing 18 that is opposite from the flange 11*f*. In the present embodiment, the ball bearing 18 is fixed in this manner. Upon completion of the fixing step, the commutator 10 is inserted over the rotatable shaft 7 from the base end of the rotatable shaft 7 to press fit the commutator 10 to the commutation fixation portion 11 b. Then, the rotor core 8 is inserted over the rotatable shaft 7 from the base end of the rotatable shaft 7 to press fit the rotor core 8 to the core fixation portion 11*a*. Thereafter, the windings 9 are wound around the rotor core 8 and are electrically connected to the commutator 10. In this way, the manufacturing of the rotor 6 is completed.

The present embodiment discussed above provides the following advantages (1) The positioning of the ball bearing 18 relative to the rotatable shaft 7 is made with the flange 11*f*, which is integrally formed in the rotatable shaft 7. Furthermore, the flange 11*f* is formed at the time of forming the small diameter portion 30*a* (the worm portion 12), which has the outer diameter smaller than that of the core fixation portion 11*a* through the cold forging process of the shaft preform 30.

Therefore, the flange 11*f* can be formed without requiring a dedicated additional process (e.g., a process of adding another component, such as a C-shaped ring) to provide the flange 11*f*. Thus, the number of the components and the number of assembling steps are not increased by the provision of the flange 11*f* in the rotatable shaft 7. Therefore, the positioning structure, which positions the ball bearing 18, can be provided at the low costs.

Furthermore, the flange 11*f* which is formed at the shaft forging step, can have the sufficiently large diameter D3 (the diameter larger than the outer diameter D4 of the shaft preform 30), which is sufficiently larger than that of the core fixation portion 11*a*, at the predetermined location of the rotatable shaft 7 by the plastic deformation of the shaft preform 30 through the cold forging process. Also, the flange 11*f* is configured to have the sufficient axial wall thickness, which provides the sufficient strength to the flange 11*f* to withstand the axial load applied from the swaged portion 11*g* through the ball bearing 18 at the time of swaging the swaged portion 11*g*. The strength of the flange 11*f* is increased through the work hardening to have the high strength (high tensile strength). Furthermore, the ball bearing 18, which contacts the flange 11*f*, can be axially positioned with high precision relative to the rotatable shaft 7 because of the strong flange 11*f*.

In addition, the swaged portion 11*g* is formed by the swaging of the outer peripheral portion (outer peripheral wall) of the rotatable shaft 7 on the axial side of the ball bearing 18, which is opposite from the flange 11*f* in the state where the ball bearing 18 is positioned with the high precision by the flange 11*f* having the high strength. Also, the swaged portion 11*g* is axially pressed against the ball bearing 18 to clamp the ball bearing 18 (more specifically, the inner race 18*a*) in corporation with the flange 11*f*. Thereby, the ball bearing 18 can be positioned and fixed at the predetermined location of the rotatable shaft 7, which is set by the flange 11*f*, within a short period of time without having a backlash (play). Thereby, the ball bearing 18 can be axially positioned with high precision relative to the rotatable shaft (rotatable worm shaft) 7 having the worm 13, and the ball bearing 18 can be fixed to the rotatable shaft 7 having the worm 13 within the short period of time at the low costs.

(2) The outer diameter D3 of the flange 11*f* is smaller than the inner diameter D1 of the outer race 18*b* of the ball bearing 18. In the motor 1 of the present embodiment, the inner race 18*a* of the ball bearing 18 is fixed to the rotatable side, specifically, the rotatable shaft 7 and is rotated integrally with the rotatable shaft 7. The outer race 18*b* is supported by the stationary side, specifically, the gear housing 21, so that the relative rotation is made between the inner race 18*a* and the outer race 18*b* Since the outer diameter of the flange 11*f* is smaller than the inner diameter D1 of the outer race 18*b*, the flange 11*f* does not contact the outer race 18*b* provided at the stationary side at the time of rotating the rotatable shaft 7 together with the flange 11*f*. Thus, it is possible to limit generation of annoying noises (e.g. metal noises), which would be otherwise generated through contact between the outer race 18*b* provided at the stationary side and the flange 11*f* provided at the rotatable side in the imaginary case where the flange 11*f* is further radially projected to contact the outer race 18*b*.

(3) In the case of the present embodiment where the ball bearing 18 is inserted over the rotatable shaft 7 from the end part of the rotatable shaft 7, which is axially closer to the core fixation portion 11*a* than to the worm portion 12 (i.e., from the first support portion 11*c* side end part of the rotatable shaft 7) at the positioning step, the flange 11*f* is formed on the axial side of the ball bearing 18 where the small diameter portion 30*a* (the worm portion 12) is located at the shaft forging step. Then, at the positioning step, the ball bearing 18 is inserted over the rotatable shaft 7 from the end part of the rotatable shaft 7, which is axially closer to the core fixation portion 11*a* than to the worm portion 12. Thus, even in an case where the outer diameter of the worm 13 (the diameter of the addendum circle of the worm 13) is made larger than the inner diameter of the ball bearing 18 (i.e., the inner diameter of the inner race 18*a*) at the worm forming step, which is performed before the positioning step, the ball bearing 18 can be inserted over and positioned relative to the rotatable shaft 7 regardless of the tooth depth of the worm 13.

(4) At the fixing step, the swaged portion 11*g* is formed all around the rotatable shaft 7 (the shaft main body 11) in the circumferential direction. Therefore, the ball bearing 18 (the inner race 18*a*) can be axially clamped between the swaged portion 11*g* and the flange 11*f* all around the rotatable shaft (the shaft main body 11). Thus, the ball bearing 18 is more securely and stably fixed to the rotatable shaft 7 with the swaged portion 11*g* and the flange 11*f*.

(5) The flange 11*f* substantially outwardly projects in the radial direction from the swaged portion 11*g*, which is formed by the swaging of the outer peripheral wall surface part of the shaft main body 11. Furthermore, the flange 11*f* is formed through the cold forging process, so that the strength of the flange 11*f* is increased to the high strength by the work hardening caused by the cold forging process. Therefore, at the fixing step, even when the swaged portion 11*g* is pressed toward the ball bearing 18, the flange 11*f* is not likely deformed. Thereby, when the ball bearing 18 (the inner race 18*a*) is clamped between the flange 11*f* and the swaged portion 11*g* to axially position and fix the ball bearing 18 (the inner race 18*a*), the ball bearing 18 can be positioned relative to the rotatable shaft 7 with high precision.

(6) The flange 11*f* can be formed to have the outer diameter D3 that is larger than the outer diameter D4 of the shaft preform 30, which later becomes the rotatable shaft 7, by the plastic deformation of the shaft preform 30 through the forging process, i.e., by the plastic flow of the metal material of the shaft preform 30. Therefore, in comparison to the case where the flange 11*f*, which has the outer diameter larger than that of the core fixation portion 11*a*, is formed through the cutting process, it is possible to limit waste of the material according to the present embodiment. Furthermore, the flange 11*f* is formed simultaneously with the small diameter portion 30*a* (the worm portion 12) at the shaft forging step. Therefore, it is possible to limit an increase in the processing time for forming the flange 11*f* in the rotatable shaft 7.

The above embodiment of the present invention may be modified as follows.

Figure 8A:
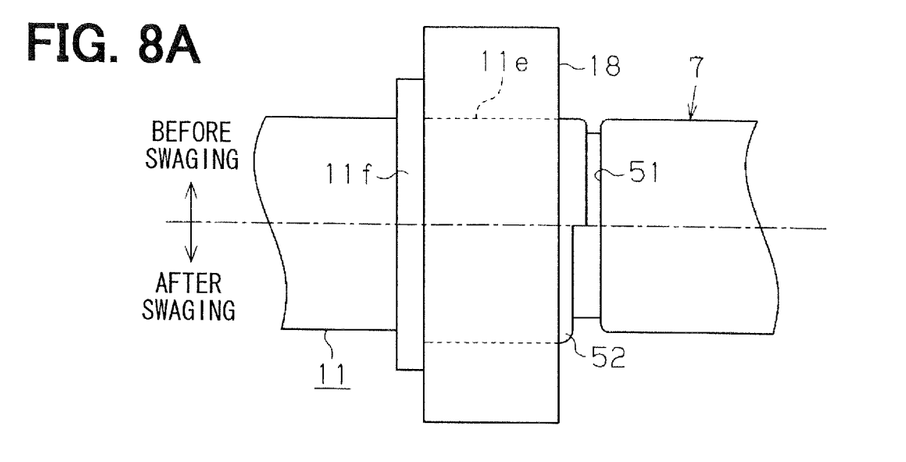
FIGS. 8A to 8C are descriptive diagrams for describing a bearing fixation method in a modification of the embodiment
Figure 8B:
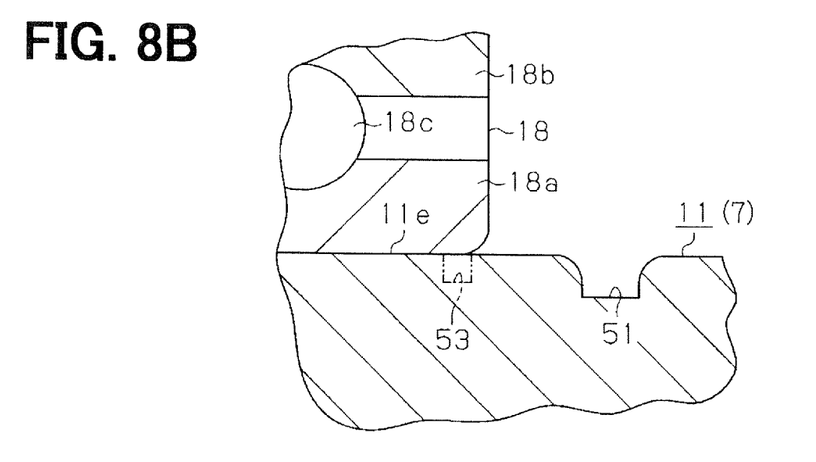
Figure 8C:
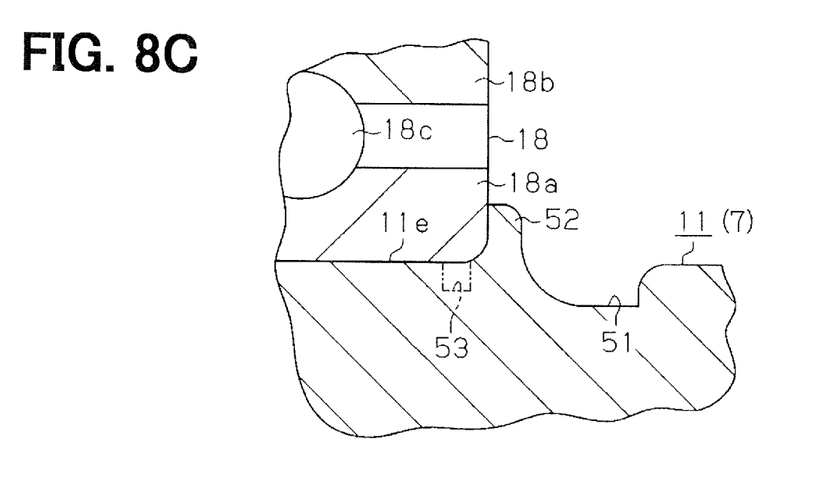

With reference to FIGS. 8A and 8B, in order to ease the formation of the swaged portion, a swaging-subject groove (swaged portion forming groove) 51 may be formed in advance at a corresponding location of the shaft main body 11, which is located on the opposite axial side of the ball bearing 18 that is opposite from the flange 11*f* and is axially exposed from the ball bearing 18, i.e., is not covered with the ball bearing 18. Specifically, the swaging-subject groove 51 is formed by, for example, a cutting process and circumferentially extends all around the shaft main body 11 at the corresponding location of the shaft main body 11. At the fixing step, an outer peripheral edge of the swaging roller 39, i.e. the swaging jig (not shown in FIGS. 8A to 8C) is radially inwardly inserted into the swaging-subject groove 51 in the radial direction of the shaft main body 11 (the direction perpendicular to the axial direction of the shaft 7) without contacting a surface of the swaging-subject groove 51 (i.e., in a non-contacting state of the swaging roller 39). Then, as shown in FIGS. 8A and 8C, the swaging roller 39 is axially moved toward the ball bearing 18, so that a part of the shaft main body 11, which is located between the swaging-subject groove 51 and the ball bearing 18, is axially pressed against the ball bearing 18. Thus, the swaged portion 52, which radially outwardly projects and is pressed against the ball bearing 18, is formed. In this way, although cutting debris may be produced because of the cutting process of the swaging-subject groove 51, a required pressure, which is applied from the swaging roller 39 against the shaft main body 11 at the time of forming the swaged portion 52, can be reduced.

Furthermore, in the above embodiment, the swaging roller 39 is moved in the radially inner direction to radially bite into the outer peripheral wall surface part of the shaft main body 11 and then is moved in the axial direction to swage the outer peripheral wall surface part of the shaft main body 11 in the axial direction. However, according to this modification, it is only required to move the swaging roller 39 in the axial direction to axially press and swage the corresponding outer peripheral surface part of the shaft main body 11 That is, it is possible to reduce the force, which is applied to the shaft main body 11 (rotatable shaft 7) in the radial direction (direction perpendicular to the axial direction) at the time of forming the swaged portion 52. Thus, it is possible to eliminate or minimize the application of force from the swaging roller 39 in the direction for causing bending or warping of the rotatable shaft 7. Thereby, it is possible to limit the deformation of the rotatable shaft 7 at the time of performing the swaging process (the time of forming the swaged portion 52).

Furthermore, as indicated by a dot-dot-dash line in FIGS. 8B and 8C, a small annular groove 53 may be formed at a part of the shaft main body 11, which is located inward of the ball bearing 18 in the radial direction of the rotatable shaft 7 and is adjacent to a swaged portion 52 side end part of the ball bearing 18. In this way, at the time of performing the swaging process, it is possible to limit the plastic deformation and radially outward bulging of the part of the rotatable shaft 7 (the shaft main body 11), which is located inward of the ball bearing 18 in the radial direction of the rotatable shaft 7, and thereby it is possible to limit deformation of the inner race 18a caused by the radially outward bulging of the part of the rotatable shaft 7 (the shaft main body 11).

Furthermore, in the above embodiment, the swaged portion 11g circumferentially extends all around the shaft main body 11 to have the annular form. Alternatively, the swaged portion 11g may only partially extend in the circumferential direction around the shaft main body 11. In such a case, the number of the swaged portion(s) 11g is not limited to one and may be two or more.

In the above embodiment, the ball bearing 18 is inserted over the rotatable shaft 7 from the base end side (core fixation portion 11a side of the flange 11f) of the shaft main body 11 at the positioning step. Alternatively, the ball bearing 18 may be inserted over the rotatable shaft 7 from the distal end side of the worm portion 12. In such a case, the outer diameter of the worm 13 (the diameter of the addendum circle of the worm 13) should be made smaller than the outer diameter of the core fixation portion 11a, and the flange 11f should be formed on the axial side of the second support portion 11e where the core fixation portion 11a is located.

In the above embodiment, the outer diameter D3 of the flange 11f is smaller than the inner diameter D1 of the outer race 18b and is larger than the outer diameter D2 of the inner race 18a. However, the outer diameter D3 of the flange 11f is not limited to this. When the outer diameter D3 of the flange 11f is set to be smaller than the inner diameter D1 of the outer race 18b, the advantage discussed in the section (2) of the above embodiment can be achieved. Furthermore, the outer diameter D3 of the flange 11f may be set to be larger than the inner diameter D1 of the outer race 18b, if desired. However, in such a case, the flange 11f should be provided to axially position the ball bearing 18 relative to the rotatable shaft 7 and should not be provided for the purpose of limiting the rotation of the ball bearing 18 relative to the rotatable shaft 7. Thereby, in the case where the outer diameter D3 of the flange 11f is set to be larger than the inner diameter D1 of the outer race 18b, the relative rotation between the flange 11f and the outer race 18b should be enabled.

In the above embodiment, the rolling-element bearing, which is fixed to the second support portion 11e, is the ball bearing 18. Alternative to the ball bearing 18, any other suitable type of rolling-element bearing may be used. That is, it is only required that the bearing, which is fixed to the second support portion 11e, is the rolling-element bearing. Therefore, for instance, the rolling-element bearing, which is fixed to the second support portion 11e, may be a well known roller bearing, which includes a plurality of cylindrical rollers (rolling elements) in place of the balls 18c rotatably held between the inner race and the outer race.

In the above embodiment, the positioning step and the fixing step are performed after the worm forming step. Alternatively, the positioning step and the fixing step may be performed before the worm forming step.

Additional advantages and modifications will readily occur to those skilled in the art. The invention in its broader terms is therefore not limited to the specific details, representative apparatus, and illustrative examples shown and described.

What is claimed is:

1. A manufacturing method of a rotor for an electric gear motor, wherein the rotor includes a rotatable shaft and a bearing, and the bearing is fixed to the rotatable shaft at an axial location between a worm portion, in which a worm is formed, and a core fixation portion, which is adapted to securely hold a rotor core of the rotor therearound, the manufacturing method comprising:

shaping a shaft preform, which is made of metal and has a generally constant outer diameter along a generally entire length of the shaft preform, by cold forging to form the rotatable shaft, so that a small diameter portion, which has an outer diameter smaller than an outer diameter of the core fixation portion, is cold-forged on the shaft preform, and a flange, which is configured into an annular form and has an outer diameter larger than the outer diameter of the core fixation portion, is cold-forged on the shaft preform at the axial location between the small diameter portion and the core fixation portion;

forming the worm in the small diameter portion to produce the worm portion having the worm by thread rolling after the shaping of the shaft preform;

positioning the bearing relative to the rotatable shaft by inserting the bearing over the rotatable shaft until the bearing contacts the flange after the forming of the worm; and fixing the bearing to the rotatable shaft after the positioning of the bearing such that a swaged portion is formed in an outer peripheral portion of the rotatable shaft on an opposite axial side of the bearing, which is axially opposite from the flange, by swaging a corresponding part of the outer peripheral portion of the rotatable shaft such that the corresponding part of the outer peripheral portion of the rotatable shaft is radially outwardly bulged to form the swaged portion, and the swaged portion is axially pressed against the bearing to axially securely clamp the bearing between the swaged portion and the flange.

2. The manufacturing method according to claim 1, wherein the shaping of the shaft preform includes inserting the shaft preform into a forging cavity of a forging die arrangement and axially pressing the shaft preform to forge the small diameter portion and the flange in a small diameter portion forging section and a flange forging section, respectively, of the forging cavity.

3. The manufacturing method according to claim 1, wherein:

the positioning of the bearing includes positioning a rolling-element bearing as the bearing in such a manner that an inner race of the rolling-element bearing is inserted over the rotatable shaft to contact the flange of the rotatable shaft, and an outer race of the rolling-element bearing is placed radially outward of the inner race, so that a plurality of rolling elements of the rolling-element bearing is rotatably held between the inner race and the outer race; and the shaping of the shaft preform includes cold forging the flange such that the outer diameter of the flange is smaller than an inner diameter of the outer race.

4. The manufacturing method according to claim 1, wherein the positioning of the bearing includes inserting the bearing over the rotatable shaft from an end part of the rotatable shaft, which is axially closer to the core fixation portion than to the worm portion.

5. The manufacturing method according to claim 1, wherein the fixing of the bearing includes forming the swaged portion all around the rotatable shaft in a circumferential direction of the rotatable shaft 6. The manufacturing method according to claim 1, further comprising forming a swaging-subject groove in a part of the outer peripheral portion of the rotatable shaft, which is axially exposed from the bearing and is located on the opposite axial side of the bearing that is axially opposite from the flange, wherein the fixing of the bearing includes radially moving a swaging jig in a radial direction of the rotatable shaft to place the swaging jig in the swaging-subject groove without contacting a surface of the swaging-subject groove and then axially moving the swaging jig to form the swaged portion and to press the swaged portion against the bearing.

7. A rotor for an electric gear motor, comprising:
a rotatable shaft that is made of metal and includes:
  a worm portion, in which a worm is formed; and
  a core fixation portion, which securely holds a rotor core therearound; and
a bearing that is fixed to the rotatable shaft at an axial location between the worm portion and the core fixation portion, wherein the rotatable shaft further includes:
  a flange, which is cold-forged on the rotatable shaft and is configured into an annular form, wherein an outer diameter of the flange is larger than an outer diameter of the core fixation portion; and
  a swaged portion, which is swaged on the rotatable shaft on an opposite axial side of the bearing that is axially opposite from the flange, wherein the swaged portion is pressed against the bearing to axially securely clamp the bearing between the flange and the swaged portion.

8. The rotor according to claim 7, wherein the rotatable shaft includes an annular groove, which is configured into an annular form that extends all around the rotatable shaft in a circumferential direction of the rotatable shaft and is placed at a corresponding axial location of the rotatable shaft, which is located inward of the bearing in a radial direction of the rotatable shaft and is axially adjacent to the swaged portion.

9. The rotor according to claim 7, wherein:
the bearing is a rolling-element bearing that includes:
  an inner race, which is fixed to the rotatable shaft;
  an outer race, which is placed radially outward of the inner race; and
  a plurality of rolling elements, which are rotatably held between the inner race and the outer race; and
the outer diameter of the flange is smaller than an inner diameter of the outer race.

10. The rotor according to claim 9, wherein the outer diameter of the flange is equal to or larger than an outer diameter of the inner race.

11. The rotor according to claim 7, wherein an axial thickness of the flange, which is measured in an axial direction of the rotatable shaft, is larger than that of an outer peripheral part of the swaged portion, which radially outwardly projects and contacts the bearing.

12. An electric gear motor, comprising:
the rotor of claim 7;
a yoke housing that receives the rotor in an inside of the yoke housing and has at least one permanent magnet fixed in the inside of the yoke housing to radially oppose the rotor core;
a yoke-side bearing that is held in the inside of the yoke housing and rotatably supports a base end part of the rotatable shaft; and
a gear housing that is connected to the yoke housing and holds the bearing of the rotor in an inside of the gear housing, wherein the gear housing rotatably receives the worm and a worm wheel which are meshed with each other, in the inside of the gear housing.

* * * * *